United States Patent [19]
Pav et al.

[11] Patent Number: 4,757,584
[45] Date of Patent: Jul. 19, 1988

[54] ROLL FOR USE IN CALENDERS AND THE LIKE

[75] Inventors: Josef Pav; Richard Rauf; Reinhard Wenzel, all of Krefeld, Fed. Rep. of Germany

[73] Assignee: Kleinewefers GmbH, Krefeld, Fed. Rep. of Germany

[21] Appl. No.: 44,334

[22] Filed: Apr. 29, 1987

Related U.S. Application Data

[63] Continuation-in-part of Ser. No. 888,115, Jul. 18, 1986, abandoned.

[30] Foreign Application Priority Data

Jul. 23, 1985 [DE] Fed. Rep. of Germany ....... 3526283

[51] Int. Cl.⁴ .................... B21B 13/02; B21B 31/32
[52] U.S. Cl. .................... 29/116.1; 29/113.2; 29/116.2; 100/162 B
[58] Field of Search ............ 29/116 R, 116 AD, 129, 29/130, 113 R; 100/93 RP, 162 B

[56] References Cited

U.S. PATENT DOCUMENTS

| | | | |
|---|---|---|---|
| 3,766,620 | 10/1973 | Roerig | 29/115 |
| 4,389,932 | 6/1983 | Pav | 29/116 AD |
| 4,520,723 | 6/1985 | Pav et al. | 29/116 AD |
| 4,679,287 | 7/1987 | Allard | 29/116 AD |

FOREIGN PATENT DOCUMENTS

| | | |
|---|---|---|
| 2420324 | 10/1975 | Fed. Rep. of Germany . |
| 2503051 | 7/1976 | Fed. Rep. of Germany . |
| 3128294 | 2/1983 | Fed. Rep. of Germany . |
| 3343313 | 11/1983 | Fed. Rep. of Germany . |

Primary Examiner—Howard N. Goldberg
Assistant Examiner—Irene Cuda
Attorney, Agent, or Firm—Peter K. Kontler

[57] ABSTRACT

A roll for use in a calender has a stationary carrier which is surrounded by a hollow cylindrical shell with the interposition of a hydraulically operated displacing unit which can flex selected portions of the shell when necessary so as to establish a preselected nip between the peripheral surface of the shell and the shell of an adjoining roll. The hydrostatic displacing unit is flanked by two antifriction bearings which operate between the carrier and the shell and are lubricated by a circuit which is independent of the circuit that supplies hydraulic fluid to the displacing unit. This renders it possible to use in the displacing unit a fluid whose temperature is much higher than the maximum permissible temperature of lubricant for the bearings. The bearings are sealed from the respective ends of the displacing unit by single seals or by multiple seals, and any leak fluid which penetrates beyond the neighboring seal is evacuated through one or more channels in the carrier and/or in the shell. Lubricant for the bearings may but need not be identical with hydraulic fluid which is supplied to the displacing unit.

27 Claims, 7 Drawing Sheets

ROLL FOR USE IN CALENDERS AND THE LIKE

CROSS-REFERENCE TO RELATED CASE

This is a continuation-in-part of the copending patent application Ser. No. 888,115 filed July 18, 1986 by Josef Pav et al. for "Roll for use in calenders and the like", now abandoned.

BACKGROUND OF THE INVENTION

The invention relates to improvements in rolls of the type often used in calenders and analogous machines for the treatment of running webs of paper or other flexible sheet material.

It is well known to mount the cylindrical shell of a roll for use in a calender on a stationary carrier and to mount the ends of the shell on suitable antifriction bearings. The space between the bearings often accommodates a hydrostatic displacing unit serving to counteract undesirable flexing of the shell in response to the pressure which is applied thereto by a neighboring roll or by the treated material. The bearings at the ends of the shell are designed to take up axial and/or radial stresses. Reference may be had to German Offenlegungsschrift No. 24 20 324 which discloses a roll wherein the hydrostatic displacing unit comprises a row of supporting elements and hydraulic motors acting upon selected supporting elements to prevent excessive or any flexing of the rotating shell. The supporting elements are biased radially outwardly toward the internal surface of the rotating shell. As a rule, the external surfaces of the supporting elements are provided with pockets which receive pressurized hydraulic fluid by way of flow-restricting channels, and the fluid which leaks from the pockets enters the internal space of the shell.

It is also known to heat the shell of the roll to an elevated temperature which is necessary to properly treat the running web of paper or the like. Hydraulic fluid which is supplied to the motors for the supporting elements can serve to heat the shell to a selected temperature. The transfer of heat from the pressurized fluid to the shell is quite satisfactory because the bodies of fluid in the pockets of the supporting elements are in large-area contact with the internal surface of the shell. It is further known to admit hydraulic fluid into the shell and to bring such fluid into contact with the internal surface of the shell at locations other than those which are occupied by the supporting elements of the hydrostatic displacing unit. For example, if a single row of supporting elements is disposed between the upper side of the carrier and the uppermost portion of the internal surface of the shell, the roll can further comprise means for admitting heated hydraulic fluid against the lower portion of the internal surface of the shell opposite the row of supporting elements.

Hydraulic fluid which is used to operate the motors of the hydrostatic displacing unit is frequently used to lubricate the bearings at the axial ends of the hydrostatic unit. Such mode of lubricating simplifies the design of the roll because there is no need to provide a discrete lubricating system. However, this also brings about certain drawbacks because the temperature of the lubricant cannot exceed a preselected maximum value which is often well below the temperature to which the shell is to be heated.

OBJECTS AND SUMMARY OF THE INVENTION

An object of the invention is to provide a novel and improved roll for use in calenders and the like wherein the temperature of fluid which lubricates the bearings need not match or even approximate the temperature of fluid which is used to operate the motor or motors of the hydrostatic displacing unit.

Another object of the invention is to provide a roll wherein the fluid which is used in the hydrostatic displacing unit may be identical with the fluid which is used for lubricating the bearings but the shell can be heated to a temperature well above that which is permissible for the lubricant in the bearings.

A further object of the invention is to provide a novel and improved method of lubricating the bearings for the rotating shell of a roll in a calender and of simultaneously supplying hydraulic fluid at an elevated temperature to the hydrostatic displacing system of the roll.

A additional object of the invention is to provide a roll wherein the shell can be heated to a temperature well above the heretofore permissible maximum temperature when the fluid which heats the shell of the roll is also used as a lubricant.

Still another object of the invention is to provide novel and improved means for supplying lubricant and heated hydraulic fluid into the interior of the rotating shell of a roll in a calender or a like machine.

The invention is embodied in a pressure applying roll for use in calenders and the like. The roll comprises a stationary carrier, a flexible rotary cylindrical shell which spacedly surrounds the carrier, hydraulically operated displacing means interposed between the carrier and the shell and being operable to displace selected portions of the shell relative to the carrier, a source of heated hydraulic fluid, means for supplying heated hydraulic fluid from the source to the displacing means, an antifriction bearing which is disposed in the shell between the carrier and the shell, a source of lubricant, means for supplying lubricant from the lubricant source to the bearing, and sealing means interposed between the carrier and the shell intermediate the bearing and the displacing means so as to prevent or to reduce the exchange of heat between the lubricant and the hydraulic fluid. As a rule, the roll will further comprise a second antifriction bearing and second sealing means in the shell. The displacing means is disposed between the two sealing means, and the second sealing means is disposed between the displacing means and the second bearing.

The composition of the lubricant may but need not be identical with the composition of the hydraulic fluid which is supplied to the displacing means. For example, the hydraulic fluid can be a thermal oil, and the temperature of oil in the fluid source can be in excess of 250° C., preferably up to and even in excess of 300° C. so as to maintain the shell of the roll at a temperature close to 300° C. The lubricant can be a gear lubricant oil.

The sealing means can comprise two annular seals which define a compartment, and the roll further comprises means for evacuating fluid which leaks into the compartment across the respective seal.

The lubricant supplying means can comprise means for circulating the lubricant from the source of lubricant to the bearing and from the bearing. Such roll can further comprise means for cooling the lubricant in the lubricant circulating means.

The sealing means can comprise two annular seals which flank the bearing and each of which defines with the bearing an annular compartment. The lubricant supplying means can comprise means for admitting lubricant into one of these compartments and means for withdrawing from the other compartment lubricant which flows from the one compartment, across the bearing and into the other compartment.

At least a portion of the means for supplying lubricant and/or means for supplying hydraulic fluid can be provided in the carrier. For example, the carrier can be provided with bores, holes, channels or like passages for the flow of lubricant and hydraulic fluid.

At least a portion of the aforementioned evacuating means for leak fluid can be provided in the carrier. Alternatively, the evacuating means can comprise at least one channel which is machined into or otherwise formed in the shell and has an intake and communicating with the compartment between the two seals and a discharge end. The evacuating means of such apparatus can further comprise a fixed housing which is adjacent one end of the shell and receives lubricant and/or fluid from the discharge end of the channel. A splash ring can be mounted on the shell in the interior of the housing. The housing can be placed next to an end face of the shell and the shell can comprise a rotor which extends into the housing and carries the splash ring.

The sealing means can comprise one or more rotating mechanical seals. For example one or more of the aforementioned discrete annular seals at one side of the bearing or at opposite sides of the bearing can constitute a rotating mechanical seal.

For example, a rotating mechanical seal can comprise a first ring which surrounds the carrier, at least one O-ring or other suitable sealing element between the carrier and the first ring, at least one second ring mounted in and arranged to rotate with the shell, at least one second sealing element between the second ring and the shell, a third ring between the first and second rings, means for biasing the third ring axially into sealing engagement with one of the first and second rings, and at least one third sealing element interposed between the third ring and the other one of the first and second rings.

The first ring can be provided with a bore for leak fluid flowing from the space for the displacing means, and the rings define a compartment which communicates with the bore. The carrier is then provided with a channel for evacuation of leak fluid from the compartment.

The sealing means can be made of elastomeric material (such as rubber or an elastomeric plastic substance) and at least one of its sealing elements can corstitute an elastic lip which bears against the carrier. Such sealing means can further comprise ring-shaped means (e.g., a split ring or the like) for biasing the elastic lip against the external surface of the carrier.

In accordance with a presently preferred embodiment of the invention, the sealing means comprises two sealing elements each of which constitutes an elastic sealing lip which bears against the carrier. The lips preferably flare apart as seen radially inwardly from the internal surface of the shell toward the external surface of the carrier. Each of the lips can be biased against the carrier by a discrete ring-shaped (annular) biasing element of spring steel, elastomeric plastic material or the like. The shell can comprise two rings and the sealing means can comprise a radially outermost annular portion which is sealingly clamped between the rings of the shell. The carrier can comprise a further ring and the lips then bear against the periphery of the ring of the carrier. The sealing means can further comprise a substantially membrane-like intermediate portion which is integral with the clamped portion of the sealing means as well as with the two sealing lips.

The novel features which are considered as characteristic of the invention are set forth in particular in the appended claims. The improved roll itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
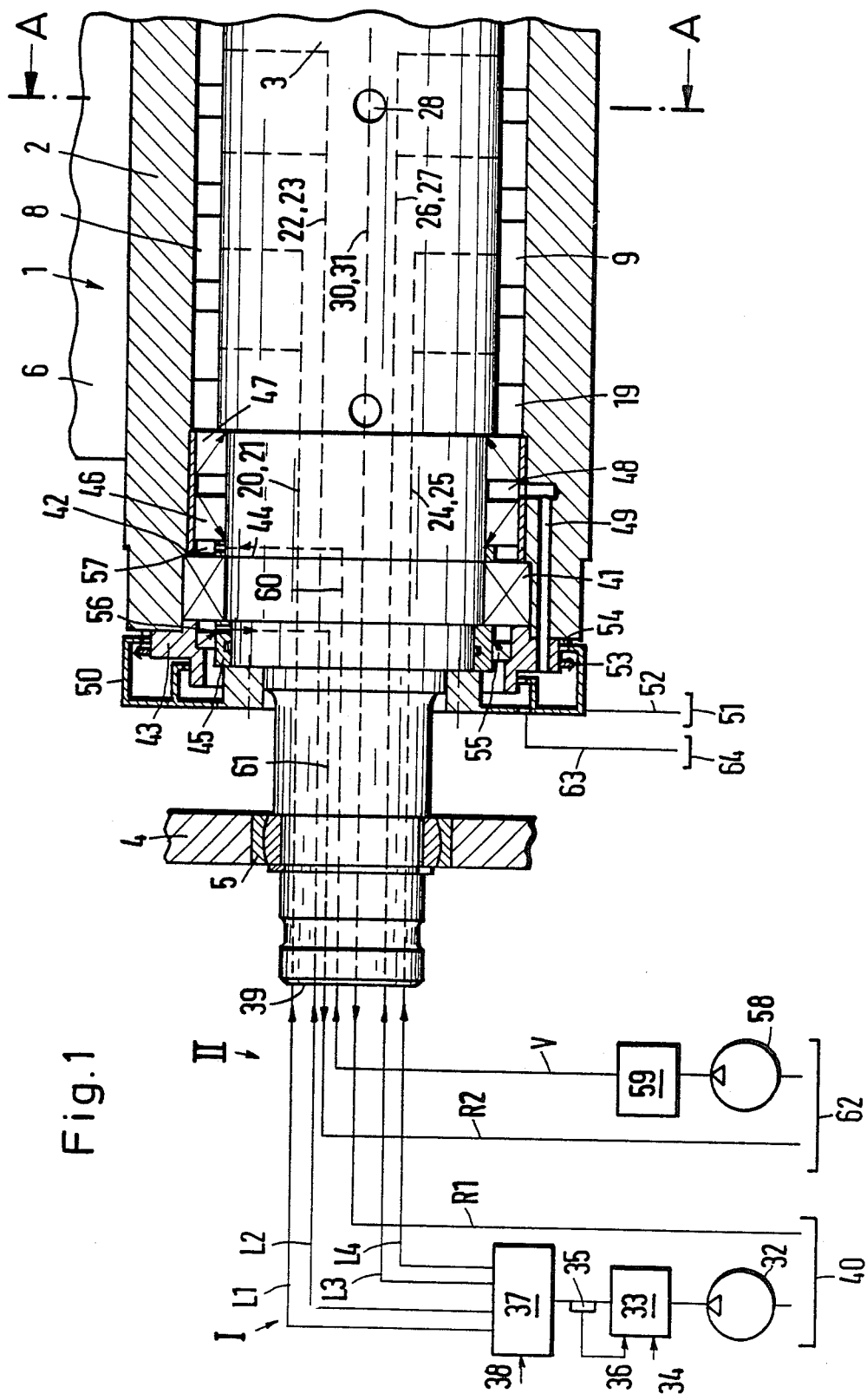
FIG. 1 is a fragmentary schematic partly elevational and partly axial sectional view of a roll which embodies one form of the present invention.
Figure 2:
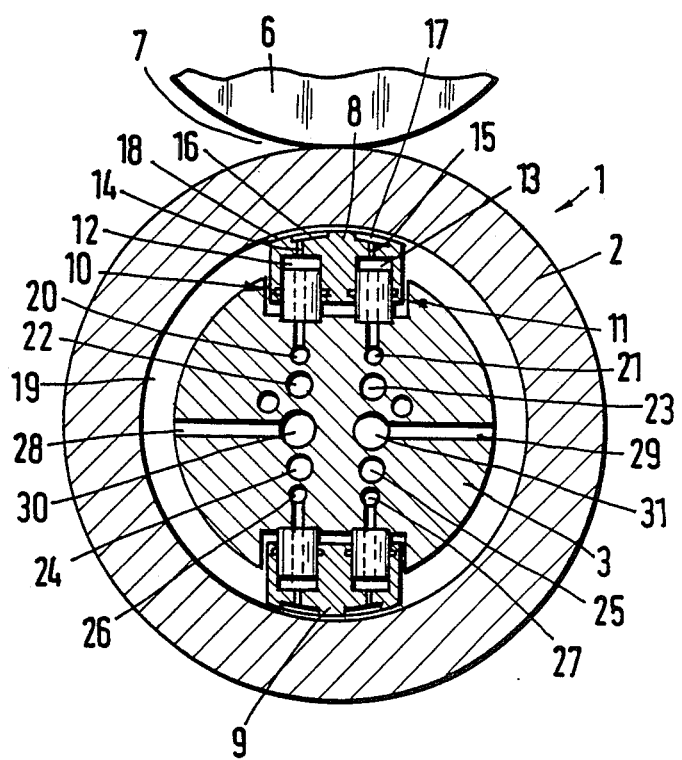
FIG. 2 is a transverse sectional view as seen in the direction of arrows from the line A—A in FIG. 1.

Referring first to FIGS. 1 and 2, there is shown a portion of a roll 1 which cooperates with a second roll 6 of a calender or the like. The rolls 1 and 6 may but need not be identical. The roll 1 comprises a stationary carrier 3 with spherical bearings 5 at its axial ends mounted in discrete upright frame members 4 (only one bearing 5 and only one frame member 4 is actually shown). The carrier 3 is spacedly surrounded by a rotary cylindrical shell 2 which defines with the shell of the second roll 6 an elongated nip 7 for a web of sheet material which is to be treated during passage between the two rolls. Such sheet material can be made of paper or other fibrous material (such as textile), a plastic sheet or a metallic foil.

The internal space 19 of the shell 2 accommodates a hydrostatic displacing unit which comprises an upper row of radially movable supporting elements 8 and a lower row of radially movable supporting elements 9. The purpose of the upper supporting elements 8 is to carry the weight of the shell 2, and the purpose of the lower supporting elements 9 is primarily to stabilize the shell during rotation about the carrier 3. The construction of the supporting elements 8 and 9 is preferably identical and, therefore, only one of the supporting elements will be described with reference to FIGS. 1 and 2. The supporting element 8 in the upper portion of FIG. 2 is provided with two cylinder chambers 12, 13 for pistons 10, 11 which are mounted in the carrier 3. The cylinder chambers 12, 13 respectively communicate with throttling channels or passages 14, 15 serving to admit pressurized hydraulic fluid into discrete pockets or recesses 16, 17 in the convex upper side of the supporting element 8. Pressurized fluid which enters the pockets 16, 17 from the respective cylinder chambers 12, 13 leaks along gaps 18 and enters the internal space 19 of the shell 2. The pistons 10, 11 are spaced apart from each other in the circumferential direction of the shell 2.

When the cylinder chamber 12 receives pressurized hydraulic fluid through a supply conduit 20 which is machined into the carrier 3, the pressurized fluid flows through the throttling channel 14 and enters the pocket 16 to leak through the gap 18 and into the internal space 19. The pressure which is established in the cylinder chamber 12 tends to lift the supporting element 8 toward the adjacent portion of the internal surface of the shell 2. The pressure in the cylinder chamber 12 is higher than in the pocket 16, and the pressure of the hydraulic fluid drops further on its way through the gap 18 and into the internal space 19 of the shell 2. The situation is the same when the supply conduit 21 of the carrier 3 admits pressurized hydraulic fluid into the cylinder chamber 13. Such fluid flows through the throttling channel 15 and into the respective pocket 17 to leak into the internal space 19.

As shown in FIG. 1, the conduits 20 and 21 supply pressurized hydraulic fluid to a first group of supporting elements 8 in the interior of the shell 2. Additional supply conduits 22, 23 supply pressurized fluid to the next group of supporting elements 8. Supply conduits 24, 25 and 26, 27 deliver pressurized hydraulic fluid to the first two groups of supporting elements 9.

Fluid which accumulates in the internal space 19 of the shell 2 flows into transversely extending channels 28, 29 of the carrier 3 and into return conduits 30, 31 which extend to the respective end face 39 of the carrier.

The conduits 20-27, the channels 28, 29 and the return conduits 30, 31 form part of a hydraulic circuit I the other parts of which are shown in the left-hand portion of FIG. 1. This circuit further comprises conduits L1, L2, L3, L4 which supply heated hydraulic fluid from a source 33 to the end face 39 of the carrier 39 for admission into the corresponding pairs of conduits 20, 21; 22, 23; 26, 27; and 24, 25. The source 33 is a heating unit having an inlet which receives pressurized hydraulic fluid from a pump 32. The pump 32 draws fluid from a vessel 40. The source 33 has a first input 34 which is connected to a source of reference signals, denoting the desired temperature of heated hydraulic fluid, and a second input 36 connected to the output of a sensor 35 monitoring the temperature of hydraulic fluid flowing from the source 33 to a pressure regulating circuit 37. The temperature of fluid in the source 33 is changed if the signals at 34 deviate from the signals at 36. The input 38 of the circuit 37 receives data from monitoring devices which are adjacent to the periphery of the shell 2 and ascertain the temperature of the respective portions of the shell. The manner in which such monitoring devices control the flow of heated hydraulic fluid from the pressure regulating circuit 37 into the conduits L1-L4 is known and need not be described here. Reference may be had, for example, to FIG. 2 of commonly owned U.S. Pat. No. 4,389,932 to Pav. The number of conduits L can greatly exceed the illustrated number. For example, the hydrostatic displacing unit can comprise a total of four, six or eight groups of supporting elements 8 and a similar number of groups of supporting elements 9. Furthermore, a vessel 40, a pump 32 and a heating unit 33 can be disposed at each axial end of the carrier 3. The return conduits 30, 31 of the carrier 3 communicate with a return conduit R1 which extends from the end face 39 of the carrier 3 and discharges hydraulic fluid into the vessel 40.

The end portions of the shell 2 rotate on antifriction ball bearings of which one (41) is shown in FIG. 1. The outer race of the bearing 41 abuts an internal shoulder 42 of the shell 2 and a rotor 43 which is mounted adjacent the left-hand end face of the shell 2. The inner race of the bearing 41 is mounted between an external shoulder 44 of the carrier 3 and a sleeve 45 which is mounted on the carrier 3.

The means for sealing the bearing 41 from the hydrostatic displacing unit including the supporting elements 8 and 9 comprises two annular seals 46 and 47 which are adjacent the right-hand end of the bearing as seen in FIG. 1. The seals 46 and 47 define an annular compartment 48 for leak fluid. The compartment 48 communicates with an evacuating channel 49 which is machined into the shell 2 and leads into a first chamber of a stationary housing 50 mounted on the carrier 3 adjacent the rotor 43. A first outlet of the housing 50 admits leak fluid into a pipe 52 which discharges into a fluid collecting receptacle 51. The housing 50 contains a splash ring 53 which is mounted on the rotor 43 so that it shares the angular movements of the shell 2. The purpose of the splash ring 53 is to adequately seal the annular gap 54 between the fixed housing 50 and the rotor 43.

A further annular seal 55 is installed in the shell 2 between the rotor 43 and the sleeve 45. This seal defines with the bearing 41 an annular compartment 56, and a further annular compartment 57 is defined by the bearing 41 with the adjacent seal 46.

The reference character II denotes a circuit for circulation of a suitable lubricant through the bearing 41. This circuit comprises a pump 58 which draws lubricant from a vessel 62 and admits it into a source of cooled lubricant here shown as a cooling device 59 operating with suitable heat exchanger and arranged to deliver a stream of lubricant into a supply conduit V extending to the end face 39 of the carrier 3 and serving to admit lubricant into a supply conduit 60 machined into the carrier 3 and discharging into the annular compartment 57 at the right-hand side of the bearing 41. Such lubricant flows through the bearing 41 and enters the compartment 56 to be evacuated from such compartment by a return conduit 61 in the carrier 3 and a further return conduit R2 discharging into the vessel 62.

The housing 50 has the aforementioned first chamber which receives spent hydraulic fluid from the channel 49 and discharges into the pipe 52, and a second chamber which collects lubricant flowing from the compartment 56 through the sleeve 45. Such lubricant is discharged into a collecting receptacle 64 by way of a pipe 63.

When the roll 1 is in actual use, the circuits I and II are properly sealed from each other by the annular seals 46 and 47 which are interposed between the bearing 41 and the hydrostatic displacing unit including the supporting elements 8 and 9. Any hydraulic fluid which leaks through or around the seal 47 enters the compartment 48 to be evacuated into the receptacle 51 by way of the channel 49, the corresponding chamber of the housing 50 and pipe 52. Proper sealing of hydraulic fluid from the lubricant for the bearing 41 renders it possible to maintain the lubricant at a temperature which is or can be much lower than the temperature of hydraulic fluid for the hydrostatic displacing unit. Furthermore, it is possible to employ a first fluid for operation of the motors which shift the supporting elements 8 and 9 radially of the shell 2, and a different second fluid medium as a means for lubricating the bearing 41. It has been found that the shell 2 can be maintained at a much higher temperature than in heretofore known rolls without affecting the operation and/or useful life of the bearing 41.

In accordance with a presently preferred embodiment, the vessel 40 contains a supply of thermal oil of the type known as Essotherm 650, and the vessel 62 contains a supply of gear lubricant oil of the type known as Mobil 634. The temperature of hydraulic fluid leaving the heating unit 33 can be maintained at a temperature in excess of 300° C. so as to maintain the shell 2 at a temperature in the range of 280° C. The temperature of lubricant leaving the cooling device 59 need not exceed 120° C.

The manner of lubricating the bearing at the other axial end of the shell 2 and of sealing such bearing from the corresponding end of the hydrostatic displacing unit is preferably identical with the manner of sealing and lubricating the bearing 41 which is shown in FIG. 1.

Applicants have discovered that many types of hydraulic fluids, such as thermal oils, can be heated well beyond the maximum permissible temperature of a conventional oil without any adverse effect upon their hydraulic properties, particularly those which are required to form a satisfactory cushion in the pockets (16, 17) of a hydrostatic displacing unit. This also applies for the layers of hydraulic fluid in the gaps 18 between the supporting elements 8, 9 and the internal surface of the shell 2. However many hydraulic fluids which are quite satisfactory for admission into the hydrostatic displacing unit will lose their lubricating properties (particularly viscosity) when they are heated to a temperature which is required to maintain the temperature of the shell 2 within a desired range, such as the aforementioned temperature in the range of 280° C. An important advantage of the improved roll is that a thermal oil or another suitable hydraulic fluid, which can be heated to a temperature that is required to properly heat the shell 2, need not simultaneously perform the function of a lubricant or, if it is called upon to lubricate the bearing or bearings 41, its temperature need not exceed that temperature beyond which the hydraulic fluid cannot act as a satisfactory lubricant. In other words, the maximum temperature of hydraulic fluid leaving the heating unit 33 can be much higher (for example, several times higher) than the temperature of lubricant which is discharged by the cooling device 59 to enter the bearing or bearings 41.

The apparatus of FIGS. 1 and 2 can be modified in a number of ways. For example, the pump 58 can draw hydraulic fluid directly from the vessel 40 so that the vessel 62 and the cooling device 59 can be omitted if the temperature of hydraulic fluid in the vessel 40 is sufficiently low to enable the fluid to properly lubricate the bearing or bearings 41. Such mode of operation contributes to simplicity and lower initial and maintenance cost of the roll because the cooling device (59) and a separate vessel (62) for lubricant can be omitted. Furthermore, such simplification of the lubricating circuit renders it possible to simplify the construction of the seal or seals between the bearing 41 and the hydrostatic displacing unit. All the seal has to do is to ensure that the rate at which hydraulic fluid leaks from the space for the supporting elements 8 and 9 is sufficiently low so that unheated hydraulic fluid which is used as a lubricant for the bearing or bearings 41 is not overheated, i.e., that the lubricant which enters the bearing or bearings 41 will still exhibit satisfactory viscosity and other desirable properties which enable it to prolong the useful life of the bearing or bearings. The embodiment which is actually shown in FIG. 1 is preferred at this time because it even more reliably ensures that the medium which lubricates the bearing or bearings 41 will exhibit optimum lubricating properties as well as that the medium which is used as a hydraulic fluid in the hydrostatic displacing device can be properly heated to an elevated temperature which is required to maintain the external surface of the shell 2 within an optimum temperature range.

If the roll employs separate sources of lubricant for the bearing or bearings 41 and of hydraulic fluid for the hydrostatic displacing unit, it is desirable to ensure that such media will not mix in the interior of the shell 2 or after they leave the roll. This is ensured by the provision of evacuating means (including the channel 49 and the housing 50) for leak fluid which passes through or around the seal 47 and enters the compartment 48, as well as by the establishment of a separate path (pipe 63) for evacuation of lubricant which passes from the bearing 41 into the compartment 56 and through or around the seal 55 into the corresponding chamber of the housing 50 to be evacuated by way of the pipe 63.

The fluid which enters the receptacle 51 can be regenerated prior to admission into the vessel 40, or it can be discarded. As a rule, the quantities of leak fluid which accumulates in the receptacle 51 are minimal, for example, a few droplets.

The cooling device 59 constitutes an optional but desirable feature of the lubricating circuit II. This cooling device ensures that the lubricant which is returned into the vessel 62 by way of the conduit R2 is properly cooled before it enters the supply conduits V and 60 for reintroduction into the compartment 57 between the bearing 41 and the adjacent right-hand seal 46. The system II ensures adequate lubrication of the bearing 41 with a circulating lubricant whose temperature is invariably maintained below a preselected maximum value. Any reasonably short-lasting contact between the circulating lubricant and the shell 2 cannot entail an overheating of the lubricant such as would affect its lubricating properties. The exact construction of the heating unit 33 and of the cooling device 59 form no part of the present invention. The same applies for the pumps 32, 58 and for the pressure regulating circuit 37.

The provision of compartments 56, 57 at opposite axial ends of the bearing 41, connection of the compartment 57 to the supply conduit 60, and connection of the compartment 56 with the return conduit 61 ensure predictable circulation of lubricant through the bearing when the roll 1 is in actual use. Lubricant is circulated from the cooling device 59 into the bearing 41 and thence into the vessel 62.

The provision of supply conduits, channels and the like in the carrier 3 contributes to compactness of the roll 2. The dimensions of the carrier 3 suffice to ensure that such carrier can be formed with a requisite number of holes, bores, channels and analogous passages for the flow of hydraulic fluid to and from the hydrostatic displacing unit as well as for the flow of lubricant to and from the bearing or bearings.

The provision of the evacuating channel or channels 49 in the shell 2 is desirable and advantageous because the orbiting channel 49 receives lea fluid under the action of centrifugal force and can deliver the accumulated fluid into the corresponding chamber of the housing 50. The housing 50 is stationary so that its connection to the pipe 52 and the mounting of the pipe 52 so that the pipe discharges into a stationary receptacle 51 present no problems. The provision of the splash ring 53 in the corresponding chamber of the housing 50 also contributes to simplicity and compactness of the housing 50 as well as of the entire roll. As mentioned before, this ring serves as a seal for the annular gap 54 between the housing 50 and the rotor 43 of the shell 2.

At least one of the seals 46, 47, 55 is or can be a so-called axial face seal or rotating mechanical seal. An advantage of such seals is that they can be made of a material which can stand elevated temperatures much better than the material of standard radial seals.

Figure 3:
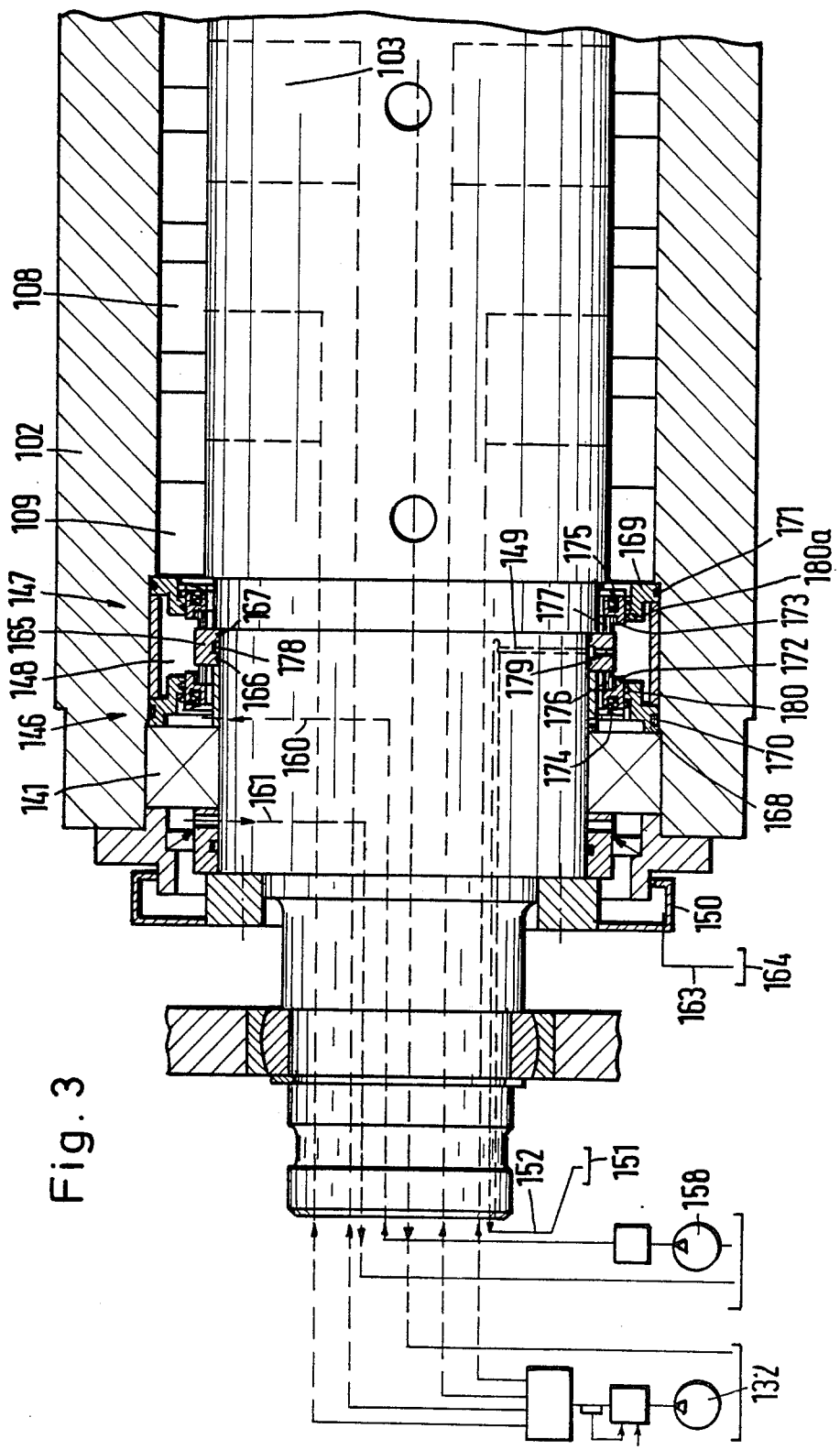
FIG. 3 is a fragmentary schematic partly elevational and partly axial sectional view of a second roll.

FIG. 3 shows a portion of a modified roll wherein all such parts which are identical with or clearly analogous to the corresponding parts of the roll 1 of FIGS. 1 and 2 are denoted by similar reference characters plus 100. The seals 146 and 147 in the shell 102 are so-called axial face seals or rotating mechanical seals. The sealing means including the annular seals 146, 147 comprises a common supporting ring 165 which surrounds the carrier 103 with the interposition of two O-rings or analogous sealing elements 166 and 167. The seals 146, 147 respectively comprise discrete supporting rings 168, 169 which are mounted on the shell 102 with the interposition of ring-shaped sealing elements 170, 171, respectively. The seals 146, 147 respectively further comprise rotary ring-shaped elements 172, 173 which are biased axially by coil springs 174, 175 so as to abut the respective end faces 176, 177 of the common supporting ring 165. The rotary ring-shaped elements 172, 173 are nonrotatably connected to the respective supporting rings 168 and 169 with the interposition of sealing elements 180, 180a. For example, the common supporting ring 165 can be made of silicon carbide and the end faces 176, 177 can be made of hard coal which is impregnated with antimony.

The common supporting ring 165 is provided with an annular groove 178 which is disposed between the sealing elements 166 and 177. The groove 178 communicates with at least one radial bore 179 which further communicates with the compartment 148. The carrier 103 is formed with an evacuating channel 149 which also communicates with the groove 178 of the supporting ring 165. The channel 149 evacuates leak fluid into a pipe 152 which is provided at the end face of the carrier 103 and discharges into a receptacle 151.

It has been found that the rotating mechanical seals 146, 147 reduce leakage of a hydraulic fluid to a minimum. In fact, no leakage takes place when the roll of FIG. 3 is in actual use, and the leakage which occurs during heating or cooling merely amounts to a few droplets.

Figure 4:
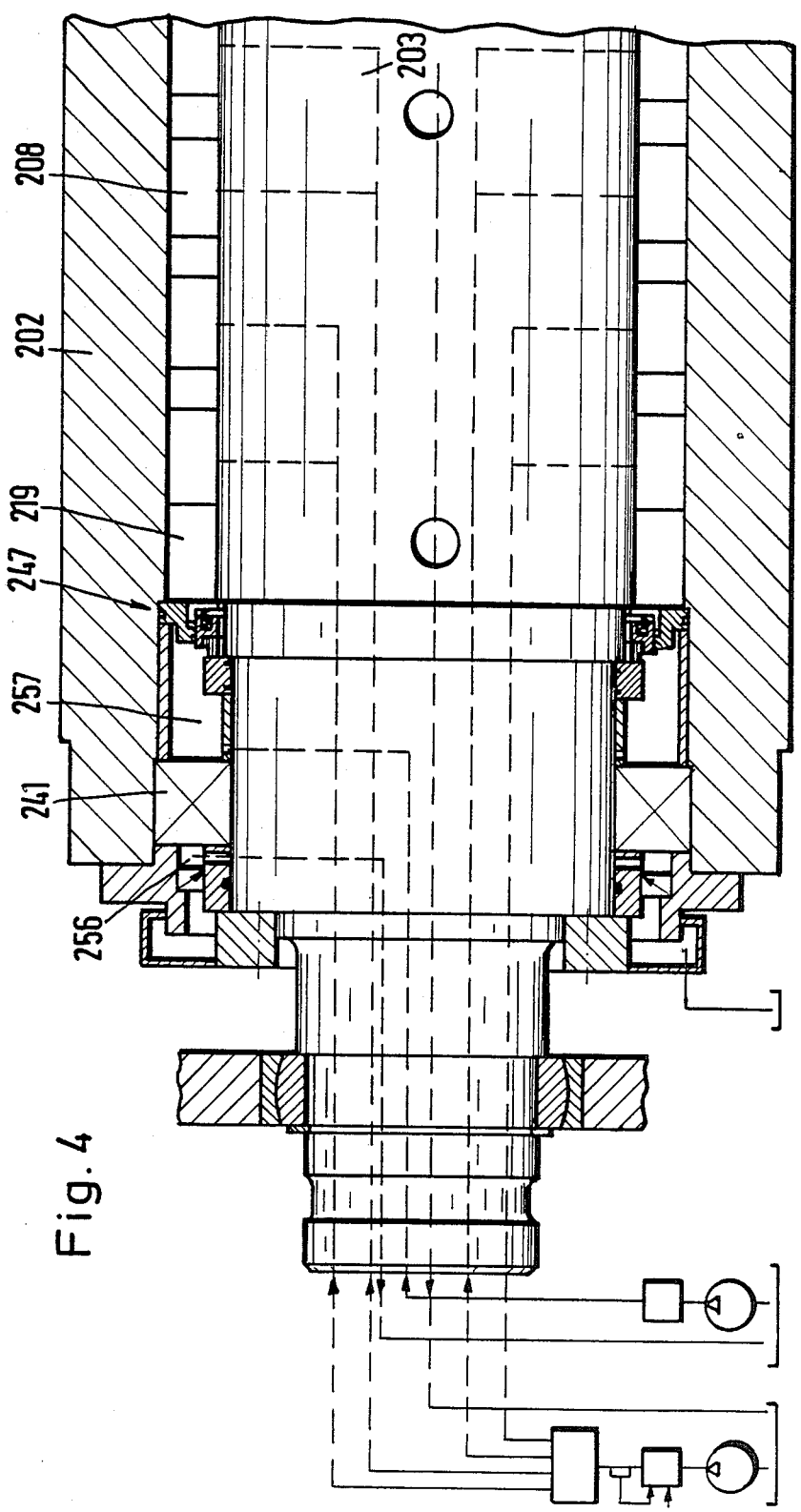
FIG. 4 is a fragmentary schematic partly elevational and partly axial sectional, view of a third roll.

FIG. 4 shows a portion of a third roll wherein all such parts which are identical with or clearly analogous to the corresponding parts of the roll of FIG. 3 are denoted by similar reference characters plus 100. The main difference between the rolls of FIGS. 3 and 4 is that the internal space 219 of the shell 202 shown in FIG. 4 contains a single rotary mechanical seal 247 which is interposed between the supporting elements (see 208) of the hydrostatic displacing unit and the bearing 241. This obviates the need for a compartment between two seals. The small quantity (a few droplets) of thermal oil which leaks into the compartment 257 of FIG. 4 cannot affect the quality of lubricant for the bearing 241.

Figure 5:
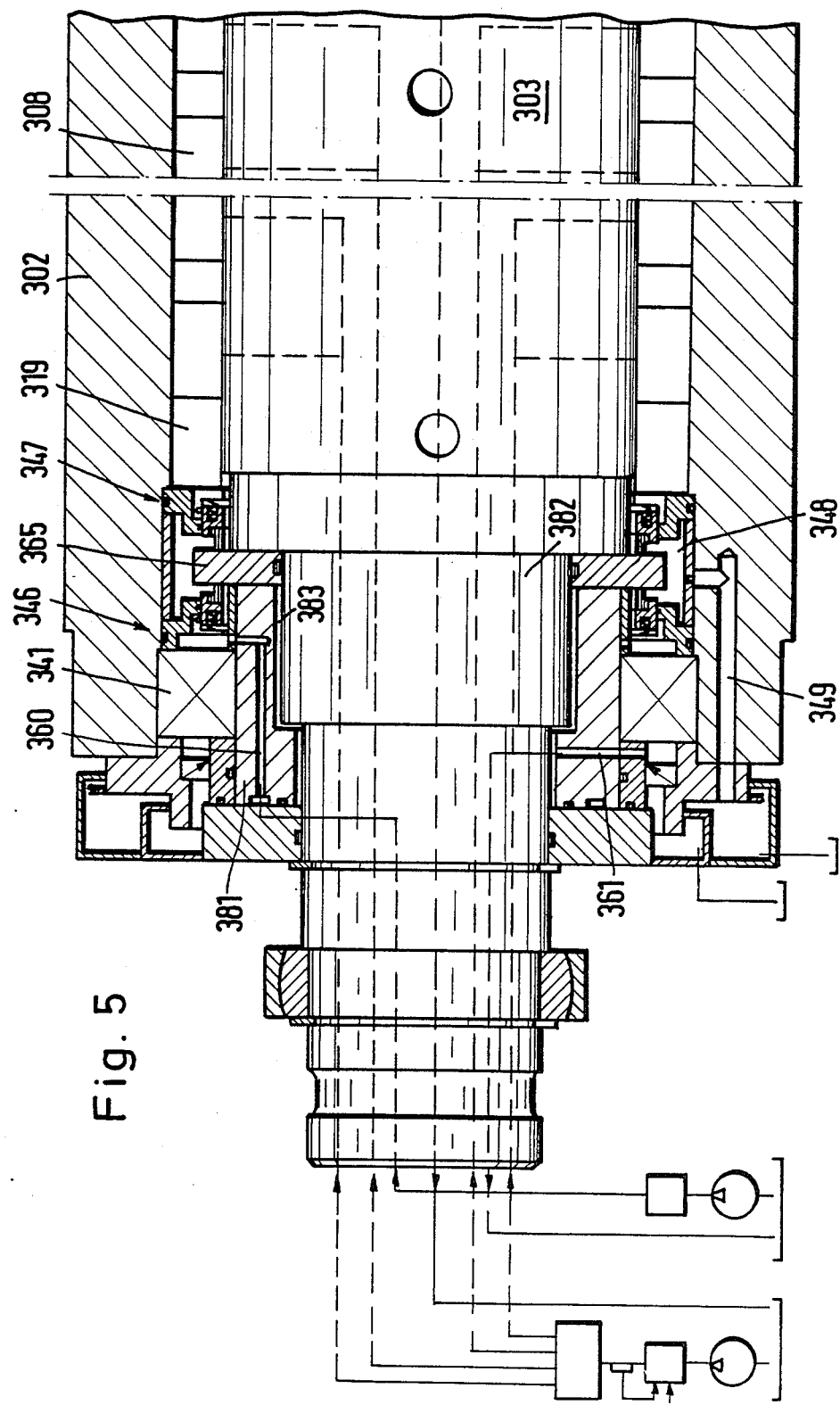
FIG. 5 is a fragmentary schematic partly elevational and partly axial, sectional view of a fourth roll.

FIG. 5 shows a fourth roll wherein all such parts which are identical with or clearly analogous to the corresponding parts of the roll of FIGS. 1-2 are denoted by the same characters plus 300. The difference between the rolls of FIGS. 3 and 5 is that the antifriction bearing 341 of FIG. 5 is mounted on a sleeve 381 which, in turn, surrounds a section 382 of the carrier 303 with an annular clearance 383. One end face of the sleeve 381 abuts a ring-shaped stop 365 on the carrier 303. The just described construction enables the axial end of the shell 302 to move radially with reference to the carrier 303. Advantages of such mounting of the shell are disclosed, for example, in commonly owned U.S. Pat. No. 4,520,723 to Pav et al.

The seals 346 and 347 of the roll which is shown in FIG. 5 cooperate with the sleeve 381 instead of cooperating directly with the carrier 303. The evacuating channel 349 is provided in the shell 302 The supply conduit 360 which admits lubricant passes through the sleeve 381 and includes an annular groove in the left-hand end face of the sleeve. The return conduit 361 for spent lubricant extends through the sleeve 381, the clearance 383 and the carrier 303.

Figure 6:
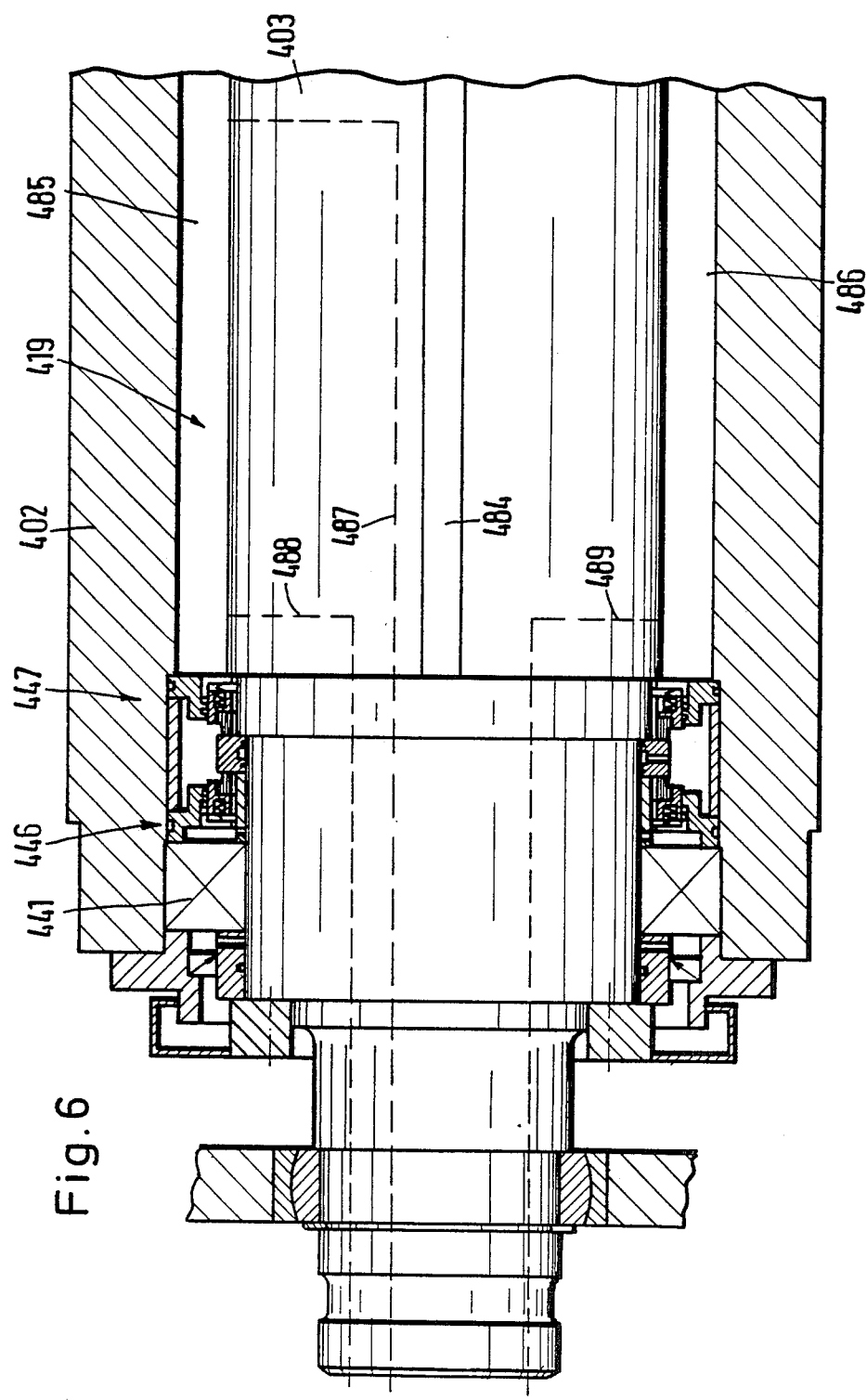
FIG. 6 is a fragmentary axial sectional view of certain parts of a fifth roll.

The roll of FIG. 6 is similar to the previously described rolls. Its parts are denoted by reference characters similar to those used in FIGS. 1-2 plus 400. This roll comprises a modified hydrostatic displacing unit having two longitudinally extending sealing strips 484 (only one shown) which divide the internal space 419 of the shell 402 into an upper chamber 485 and a lower chamber 486. Such so-called floating hydrostatic displacing unit is fully described, e.g., in German Offenlegungsschrift No. 31 28 294. The strips 484 are preferably disposed diametrically opposite each other. The upper chamber 485 is filled with a working fluid at a requisite pressure. In order to maintain the shell 402 at a requisite elevated temperature, the fluid contents of the chamber 485 are continuously recirculated by way of a supply conduit 487 and a return conduit 488, both provided in the stationary carrier 403. A return conduit in the form of a channel 489 in the carrier 403 is provided to evacuate leak fluid from the lower chamber 486.

Figure 7:
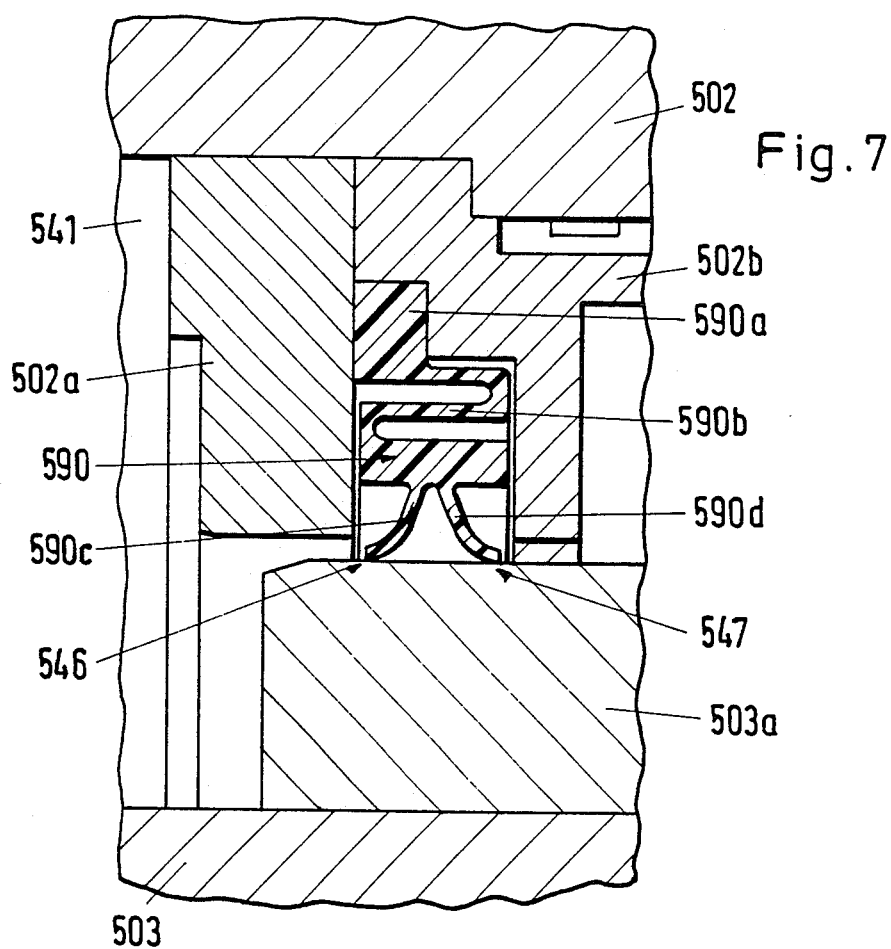
FIG. 7 is a fragmentary axial sectional view of certain parts of a sixth roll.

FIG. 7 shows a portion of a further roll wherein all such parts which are identical with or analogous to the corresponding parts of the roll 1 of FIGS. 1 and 2 are denoted by similar rereference characters plus 500. The carrier 503 is surrounded by a stationary ring 503a which, in turn, is spacedly surrounded by two rings 502a, 502b which rotate with the shell 502. The rings 502a, 502b are installed between the antifriction bearing 541 and the nearest element of the hydrostatic displacing unit between the upper portion of the carrier 503 and the shell 502. The sealing means 590 between the antifriction bearing 541 and the hyrostatic displacing unit is made of elastomeric plastic material and includes a radially outermost portion 590a which is clamped between the rings 502a, 502b, an intermediate portion which acts not unlike a membrane and has the effect of a radially compressed spring, and two elastic seals 546 and 547 in the form of lips 590c, 590d which are integral with the membrane 590 and abut the periphery of the ring 503a. The lips 590c, 590d flare away from each other radially inwardly, i.e., toward the periphery of the ring 503a. This ensures that their sealing action improves with increasing pressure of the fluid which tends to leak between the hydrostatic displacing unit and the antifriction bearing 541.

Figure 8:
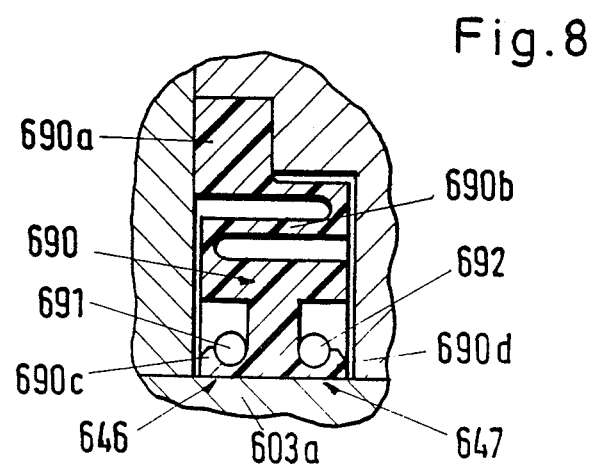
FIG. 8 is a fragmentary axial sectional view of certain parts of a seventh roll.

FIG. 8 shows a modification of the structure of FIG. 7. The ring 603a on the carrier (not shown) is surrounded by a modified sealing means 690 having a radially outermost portion 590a clamped between the rings on the shell (not shown), a median portion or membrane 690b and two seals 646, 647 in the form of lips 690c, 690d, respectively. In order to enhance the sealing action between the lips 690c, 690d on the one hand and the ring 603a (carrier) on the other hand, the sealing means 690 of FIG. 8 further comprises two rings 691, 692 which respectively bias the radially innermost portions of the lips 690c, 690d against the peripheral surface of the ring 603a.

The improved roll is susceptible of many additional modifications without departing from the spirit of the invention. This applies particularly for the hydrostatic displacing unit. For example, the so-called floating hydrostatic unit of FIG. 6 can be combined with a hydrostatic displacing unit employing one or more rows of supporting elements of the type shown in FIGS. 1–5. Furthermore, each supporting element (such as the elements 8 and 9) can be acted upon by a single hydraulic motor or by three or more hydraulic motors. Still further, the discrete heating unit 33 of FIG. 1 can be omitted if such heating unit or another suitable heating unit is incorporated directly into the vessel (such as the vessel 40 of FIG. 1). The same applies for the cooling device 59 of FIG. 1, i.e., such cooling device can be incorporated into the respective vessel 62.

Applicants are aware of the disclosures of U.S. Pat. No. 3,766,620, German Offenlegungsschriften Nos. 33 43 313 and 25 03 051, "Küsters Schwimmende Walze" (1974) and European patent application Ser. No. 0 179 730 (corresponding to U.S. Ser. No. 657,738 now U.S. Pat. No. 4,679,287).

Without further analysis, the foregoing will so fully reveal the gist of the present invention that others can, by applying current knowledge, readily adapt it for various applications without omitting features that, from the standpoint of prior art, fairly constitute essential characteristics of the genetic and specific aspects of our contribution to the art and, therefore, such adaptations should and are intended to be comprehended within the meaning and range of equivalence of the appended claims.

We claim:

1. A pressure applying roll for use in calenders and the like, comprising a carrier; a flexible rotary cylindrical shell spacedly surrounding said carrier; hydraulic displacing means interposed between said carrier and said shell and operable to displace selected portions of said shell relative to said carrier; a source of heated hydraulic fluid; first supplying means for supplying fluid from said source to said displacing means; an antifriction bearing interposed in said shell between said carrier and said shell; a second fluid containing source of lubricant; second supplying means for supplying lubricant from said second source to said bearing; and sealing means interposed between said carrier and said shell intermediate said bearing and said displacing means to prevent or to reduce interaction between the lubricant and the fluid, said sealing means comprising a first sealing element nearer to said bearing than to said displacing means and arranged to oppose the flow of lubricant from said bearing toward said displacing means and a second sealing element nearer to said displacing means than to said bearing and arranged to oppose the flow of fluid toward said bearing.

2. The roll of claim 1, further comprising a second bearing and second sealing means in said shell, said displacing means being disposed between said first named and said second sealing means and said second sealing means being disposed between said displacing means and said second bearing.

3. The roll of claim 1, wherein the composition of said lubricant is identical with the composition of said hydraulic fluid.

4. The roll of claim 1, wherein the hydraulic fluid is a thermal oil and the temperature of oil in said fluid source is in excess of 250° C.

5. The roll of claim 1, wherein the hydraulic fluid is a thermal oil and the temperature of oil in said source of fluid is in excess of 300° C.

6. The roll of claim 1, wherein the lubricant is gear lubricant oil.

7. The roll of claim 1, wherein said sealing elements define a compartment and said sealing means further comprises means for evacuating fluid which leaks into said compartment across the respective sealing element.

8. The roll of claim 1, wherein said lubricant supplying means comprises means for circulating the lubricant from the source of lubricant to said bearing and from said bearing.

9. The roll of claim 8, further comprising means for cooling the lubricant in said circulating means.

10. The roll of claim 1, wherein said sealing means comprises two annular seals which flank said bearing and each of which defines with the bearing an annular compartment, said lubricant supplying means comprising means for admitting lubricant into one of said compartments and means for withdrawing from the other of said compartments lubricant which flows from said one compartment, across the bearing and into the other compartment.

11. The roll of claim 1, wherein at least a portion of at least one of said supplying means is provided in said carrier.

12. The roll of claim 1, wherein said sealing elements define a compartment and further comprising means for evacuating fluid which leaks into said compartment across the respective sealing element, at least a portion of said evacuating means being provided in said carrier.

13. The roll of claim 1, wherein said sealing elements define a compartment and further comprising means for evacuating fluid which leaks into said compartment across the respective sealing element, said evacuating means comprising a channel provided in said shell and having an intake end communicating with said compartment and a discharge end, said evacuating means further comprising a fixed housing adjacent said shell and receiving fluid from the discharge end of said channel.

14. The roll of claim 13, further comprising a splash ring mounted on said shell and disposed in said housing.

15. The roll of claim 14, wherein said shell has an end face adjacent said housing and a rotor secured to said shell in the region of said end face, said splash ring being provided on said rotor.

16. The roll of claim 1, wherein said sealing means comprises a rotating mechanical seal.

17. The roll of claim 1, wherein said second sealing element includes a rotating mechanical seal.

18. The roll of claim 1, wherein said first sealing element comprises a rotating mechanical seal.

19. The roll of claim 1, wherein said sealing means further comprises a first ring surrounding said carrier, at least one second ring mounted in said shell, a third ring between said first and second rings, means for biasing said third ring axially into sealing engagement with one of said first and second rings, and at least one third sealing element interposed between said third ring and the other of said first and second rings, said first sealing element being disposed between said carrier and said first ring and said second sealing element being disposed between said second ring and said shell.

20. The roll of claim 19, wherein said first ring has a passage for leak fluid and said rings define a compartment which communicates with said passage, said carrier having a channel for evacuation of leak fluid from said compartment.

21. The roll of claim 1, wherein at least one of said sealing elements comprises an elastic lip which bears against said carrier.

22. The roll of claim 21, wherein said sealing means further comprises ring-shaped means for biasing said lip against said carrier.

23. The roll of claim 1, wherein each of said sealing elements comprises an elastic lip which bears against said carrier, said lips flaring away from each other as seen in a direction radially inwardly from said shell toward said carrier.

24. The roll of claim 23, wherein said sealing means further comprises substantially ring-shaped means for biasing said lips against said carrier.

25. The roll of claim 23, wherein said shell comprises two rings and said sealing means comprises a portion which is clamped between said rings, said carrier comprising a further ring and said lips bearing against the periphery of said further ring.

26. The roll of claim 25, wherein said sealing means further comprises a substantially membrane-like portion which is integral with said clamped portion and with said lips.

27. The roll of claim 1, wherein each of said sealing elements comprises an elastic lip and said sealing means further comprises means for integrally connecting said lips to each other.

* * * * *